United States Patent [19]

Gaudet et al.

[11] Patent Number: 4,573,138
[45] Date of Patent: Feb. 25, 1986

[54] JUSTIFYING WITH PRINTER LEVEL DATA STREAM WHICH ACCOMMODATES FOOTERS AND HEADERS

[75] Inventors: James L. Gaudet, Austin; Harry L. Lineman, Round Rock; Rudolph E. Chukran, Austin; Grover H. Neuman, Austin; Johnny G. Barnes, Austin, all of Tex.

[73] Assignee: International Business Machines Corp., Armonk, N.Y.

[21] Appl. No.: 440,235

[22] Filed: Nov. 9, 1982

[51] Int. Cl.[4] .............................. G06F 3/09; B41J 5/30
[52] U.S. Cl. ...................................... 364/900; 400/63
[58] Field of Search ... 364/200 MS File, 900 MS File; 400/5, 63, 3, 4, 6, 7

[56] References Cited

U.S. PATENT DOCUMENTS

| | | | |
|---|---|---|---|
| 3,297,124 | 1/1967 | Sims | 400/63 |
| 3,559,208 | 1/1971 | Giugno et al. | 340/717 |
| 3,837,459 | 9/1974 | Martin | 400/63 |
| 4,265,554 | 5/1981 | Clancy et al. | 400/316 |
| 4,330,847 | 5/1982 | Kuseski | 364/900 |
| 4,348,738 | 9/1982 | Grier et al. | 364/900 |
| 4,357,680 | 11/1982 | Greek, Jr. et al. | 364/900 |

Primary Examiner—James D. Thomas
Assistant Examiner—Thomas Lee
Attorney, Agent, or Firm—C. Lamont Whitham; J. B. Kraft; John L. Jackson

[57] ABSTRACT

In order to avoid the problem of the last line of the body text not being justified when it is not the end of a paragraph but is followed by a footer, a converter/processor (13) is provided to modify the print data stream produced by another converter/processor (12) from the revisable or editable text data stream. If during conversion from the revisable data stream to the print data stream a "last body text line" is found and it is not the end of a paragraph, a latch (34) is set. Then, with each line of print data stream text, the latch is checked, and if the latch is set and the text line ends with a carriage return, the carriage return is replaced with a zero-index-carriage return and an index. These act similar to a carriage return in all cases except one—the text line which they terminate may now be justified.

10 Claims, 5 Drawing Figures

JUSTIFYING WITH PRINTER LEVEL DATA STREAM WHICH ACCOMMODATES FOOTERS AND HEADERS

DESCRIPTION

1. Technical Field

The present invention pertains to word processing and more particularly to means for simplifying the printer level data stream by limiting the control code information necessary in the data stream in order to affect justification of designated groups of lines in the document to be formatted and printed.

2. Background Art

In the field of word processing, certain data stream conventions have been devised in order to facilitate the communication of data between various editing display terminals and printers. Among the many conventions adopted in the industry are "revisable data streams" and "printable data streams". The former was devised to allow flexible editing of the information, while the latter was devised to allow the less complex output function without the burdensome function of editing. However, revisable data streams cannot usually be printed directly but must first be converted to a printable data stream. The process of converting a revisable data stream into a printable data stream removes certain information which in some cases is vital to maintain the proper print image of the printable data stream. At the same time, it is desirable to keep the printable data stream as simple as possible.

In a simplified procedure for limiting the control code information necessary in the printable data stream in order to affect justification of designated groups of lines in a document to be formatted and printed, a control code indicator marking the beginning of the group of lines to be justified and another marking the end of the group of lines to be justified are set. These control codes automatically control the justification of the lines in the group. Of course, the justification has to be carried out in accordance with certain basic justification rules, one of which is that if the line is at the end of a paragraph, it will not be justified.

Since justification is temporarily deactivated at the end of a paragraph, it is necessary to identify the end of a paragraph, and one way of doing this is by two or more carrier returns in a row. However, in combination with other automated editing, a problem arises. Double carriage returns will also occur with headers and footers creating what appear to be paragraph boundaries. For example, a double carriage return will occur at the end of a header, but this causes no problem because headers are never justified so no visible problems occur on the physical page. On the other hand, a double carriage return at the end of the body of text for the current page prior to a footer may cause a problem. If the body text for the current page ends at a simple line boundary in mid-paragraph, the addition of a double carriage return prior to the footer causes the system to treat the last line of the body text as the end of a paragraph with the result that the last line will not be justified. The result is that the whole aesthetic format of the page will be dominated by the incongruous bottom line.

DISCLOSURE OF THE INVENTION

The present invention avoids the problem of the last line of the body text not being justified when it is not the end of a paragraph but is followed by a footer, and this is accomplished while still maintaining the simplicity and efficiency of the automated sequential print level data stream. Briefly, in accordance with the present invention, this is accomplished during the conversion from the revisable data stream to the printable data stream. If during this conversion a "last body text line" is found and it is not the end of a paragraph, then a latch is set. Otherwise the latch is reset. Within the converter, with each line of text received, the latch is tested. If the latch is set and the text line ends with a carriage return, the carriage return is replaced with a zero-index-carriage return (ZICR) and an index (INX). These act similar to a carriage return in all cases except one—the text line which they terminate may now be justified. The original carriage return may have been followed by another carriage return which, by convention, means the preceding text line could not have been justified, but now, by the same convention, the line ended by a ZICR can always be justified.

BEST MODE FOR CARRYING OUT THE INVENTION

The present invention provides for correct line justification for a print level data stream to be communicated between word processors and to be printed and justified by another word processor printer or a simple printer. The print level data stream has justification indicated only by begin and end controls. Also included in this data stream are top and bottom margin text with appropriate blank lines separating body text and bottom margin text. The last line of the body text must always be correctly marked for justification or not, as indicated by the operator.

This invention provides a word processor with the capability of correctly justifying the last line of body text by recognizing and handling two cases. The first case occurs when the last line of body text actually ends a paragraph. A paragraph is a series of lines of text stored on the diskette by the operator. The last line of a paragraph is always ended with some line ending control character(s) which mark it, so that it may be recognized as a paragraph boundary. When the last line of body text actually ends a paragraph, it is left as is for purposes of communication and eventual printing.

The second case occurs when the last body text line is not a paragraph boundary. Because multiple carrier returns may follow this, to space down to the bottom margin text, it will appear as a paragraph boundary to remote word processors or printers. This is not correct and must be modified so that the last body text line will not appear as a paragraph boundary. The carrier return that ends the last body text line is replaced with a ZICR plus an index. A line ending with a ZICR may always be justified since it does not appear to be a paragraph boundary.

Figure 1:
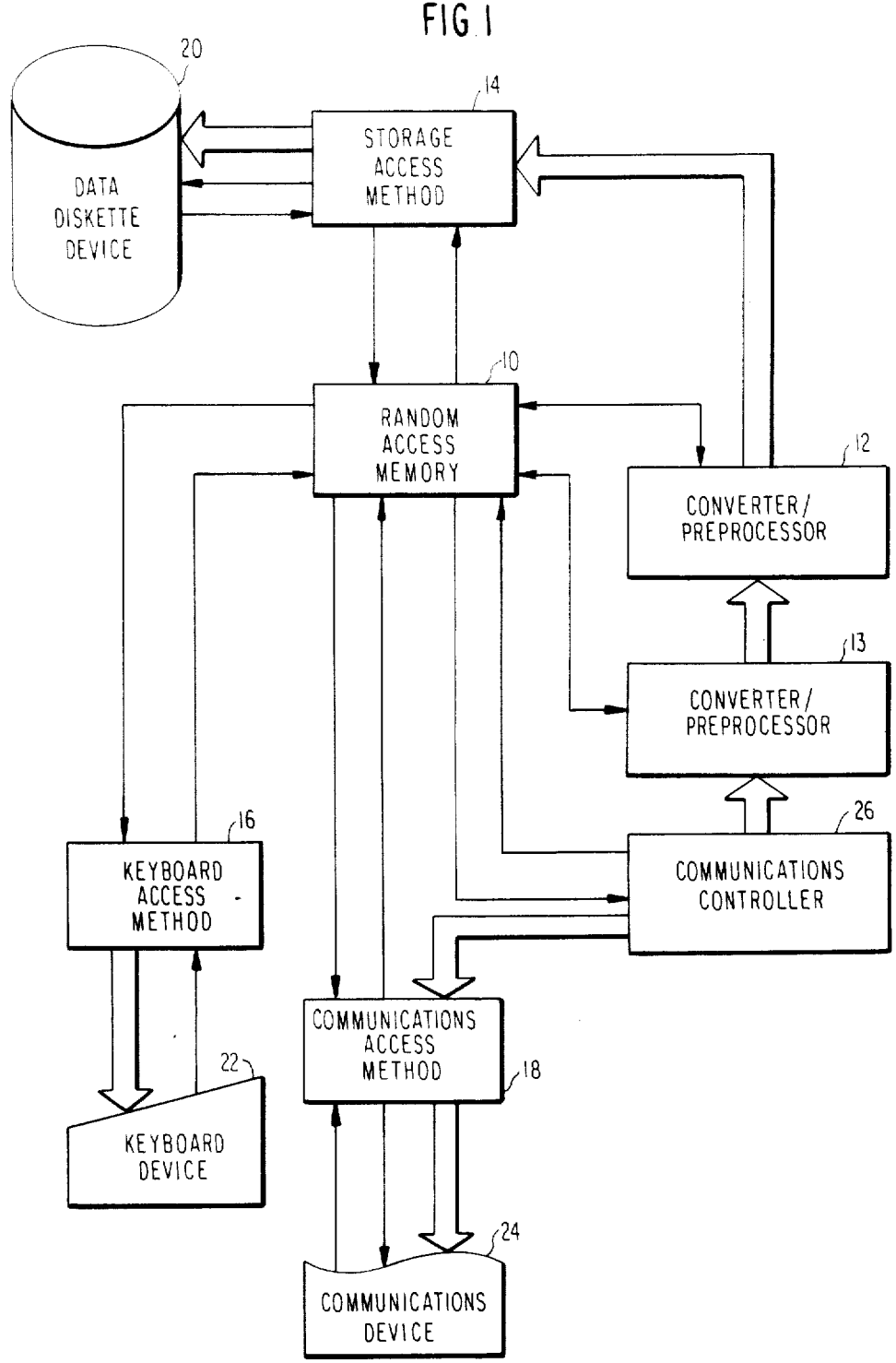
FIG. 1 is a block diagram of the functional units of a word processing system which relate to the present invention.

FIG. 1 shows the various functional components of a word processing system which are involved in allowing the last body text line to be justified, while converting revisable or editable text data stream to print level text data stream. The single line arrows represent the flow of data, and the double line arrows represent the flow of control. The components include a random access memory 10, a first converter/preprocessor 12, a second converter/processor 13, storage access method 14, keyboard access method 16 and communications access method 18, as well as various peripheral devices such as a data diskette device 20, a keyboard device 22 and communications device 24. In addition, a communications control 26 is provided which interfaces with memory 10, converter 13 and communications access method 18.

Figure 2:
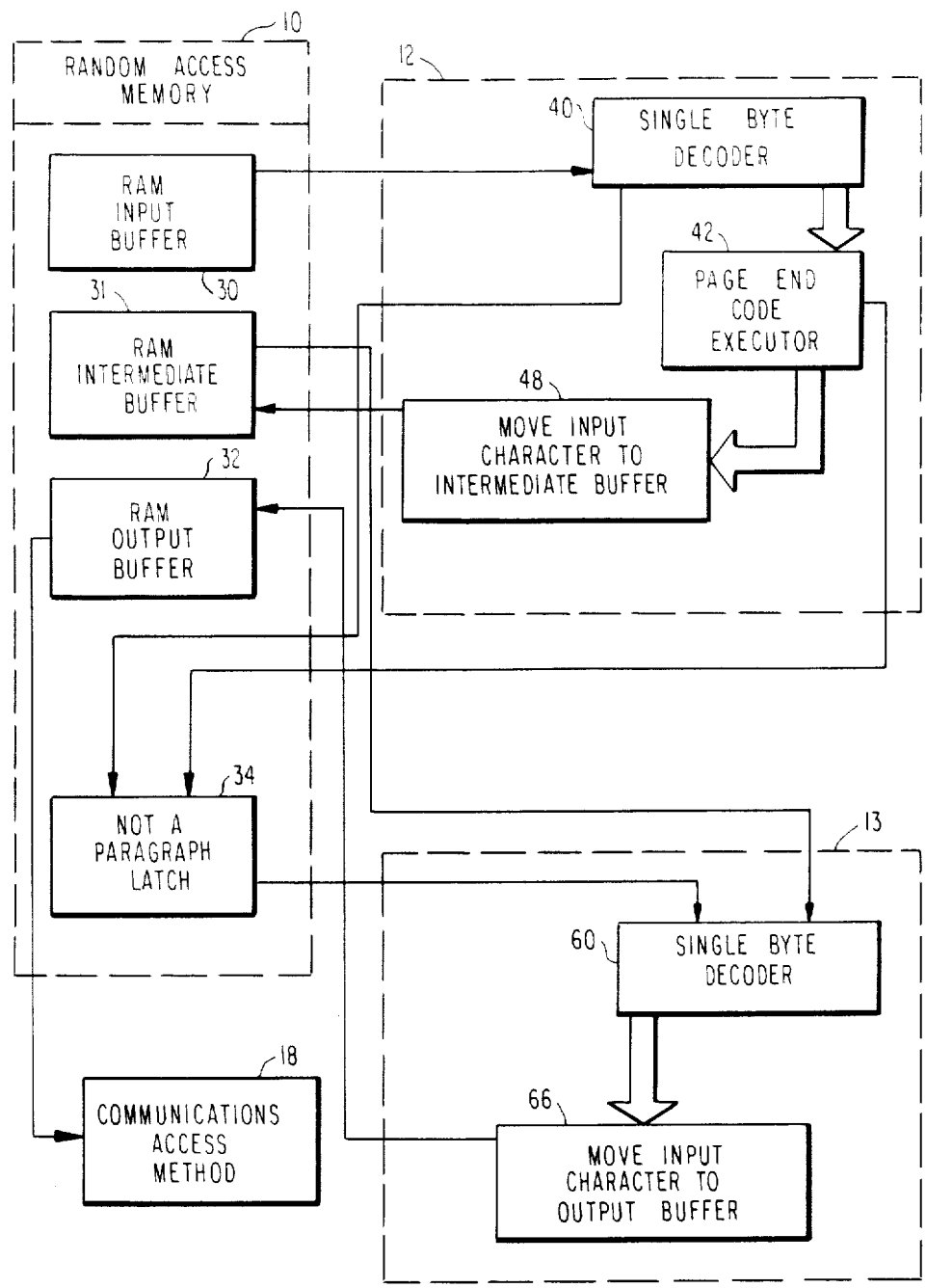
FIG. 2 is a block diagram showing the functional units of the converter/processors, random access memory, and the communications access method illustrated in FIG. 1.

Random access memory 10 contains an input buffer 30, intermediate buffer 31, output buffer 32 and a not a paragraph latch 34 (FIG. 2). As shown in FIG. 1, memory 10 interfaces with the converter/preprocessors 12 and 13, storage access method 14, keyboard access method 16, communications access method 18 and communications controller 26.

The converter/preprocessors 12 and 13 are an interface between the internal diskette code set and code sets used by remote printers and communication access methods. The primary function of the converter/preprocessors is to convert the internal diskette code into a printable data stream. This preprocessing function takes the internal EBCDIC code set and generates a simple subset in EBCDIC, which can then be used and/or translated by specific access methods. As shown in FIG. 1 and in greater detail in FIG. 2, converter 12 takes data from the input buffer 30 of random access memory 10, operates on it and passes it to converter 13 which then provides a printable data stream to the output buffer 32. The printable data stream, which includes certain line end codes provided by the present invention, is accessed from output buffer 32 by communications access method 18. The relevant subfunctions of converters 12 and 13 are shown in FIG. 2 and are described below in greater detail.

Referring again to FIG. 1, storage access method 14 is a collection of programs which is used to interface various components of the system to the data diskette device 20. Whenever in the process of acquiring an input data stream converter 12 makes a request, storage access method 14 requests the data from the diskette and places it in memory in input buffer 30 (FIG. 2), where it can be accessed for preprocessing by converter 12.

The keyboard access method 16 is a collection of programs which interface with the keyboard device 22 from which the operator keys the primary input. The keyboard 22 has indirect control of the communications process through the memory 10. Once the operator initiates the action via keyboard 22, the action completes itself under control of the communications controller 26 and no further operator interaction is required.

The communications access method 18 is a set of programs which interface to the communication device 24. Communications access method 18 takes data converted by converter 13, puts it back into memory 10 and sends it to the communications device 24 under the control of communications controller 26.

Figure 3:
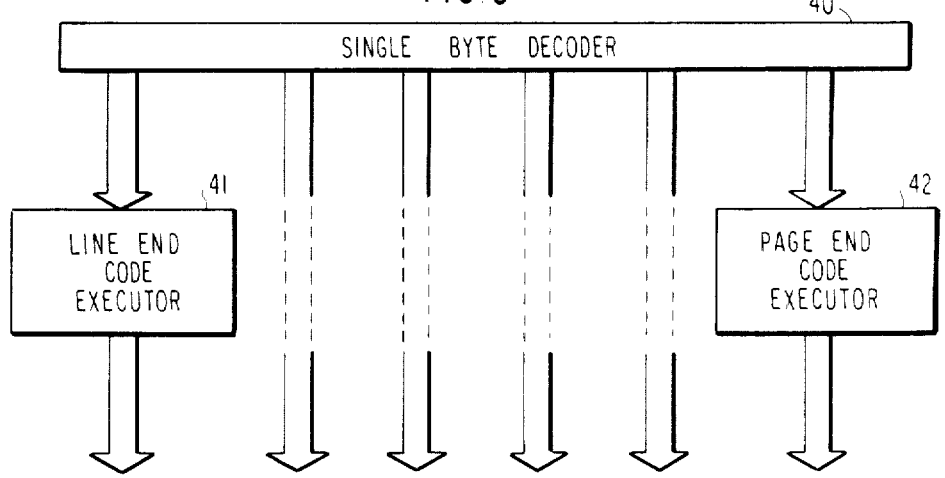
FIG. 3 is a flow chart showing the flow of control from the single byte decoder in the converter/processor 12 to the page end code executor.

FIG. 2 shows five subfunctions of the converter/preprocessors 12 and 13 which relate to the present invention. These include the single byte decoders for each of the converters, page end code executor for converter 12, and move input character to intermediate output buffer functions. These subfunctions are shown in FIGS. 3-5 and described below in greater detail.

The single byte control decoder 40 shown in FIG. 2 is at the top of the hierarchy in terms of the flow of control. Decoder 40 decodes all single byte control codes, of which only the page end code is of interest here. As shown in FIGS. 2-3, decoder 40 passes control to the page end code executor 42 when the appropriate page end code is encountered in the data stream. As shown in FIG. 3, a line end code is passed to line end code executor 41 and other nonline end codes, including graphic character codes, are also decoded by decoder 40, but these codes are not directly germane to the present invention. Accordingly, the logic which decodes this data into the intermediate printer data stream (PDS) is not shown or described. Decoder 40 transfers control to other subfunctions, not illustrated in FIG. 3, which obtain ordinary nonline end codes from the input buffer, process and copy it into the output buffer 32.

The converter 12 processes the input data which is a revisable or editable text data stream and converts this data stream to a print level data stream in a conventional manner. It resolves headers and footers and adds extra carriage returns as required. In so doing, however, the information as to whether the last line of the body text preceding a footer is the end of a paragraph or not was lost. It is the converter 13 which implements the solution of the present invention, and this is accomplished by further processing the PDS output of converter 12 to produce the printable data stream that is read into output buffer 32. A new latch is added to the PDS. This latch is the interface between converters 12 and 13.

Figures 4, 5:
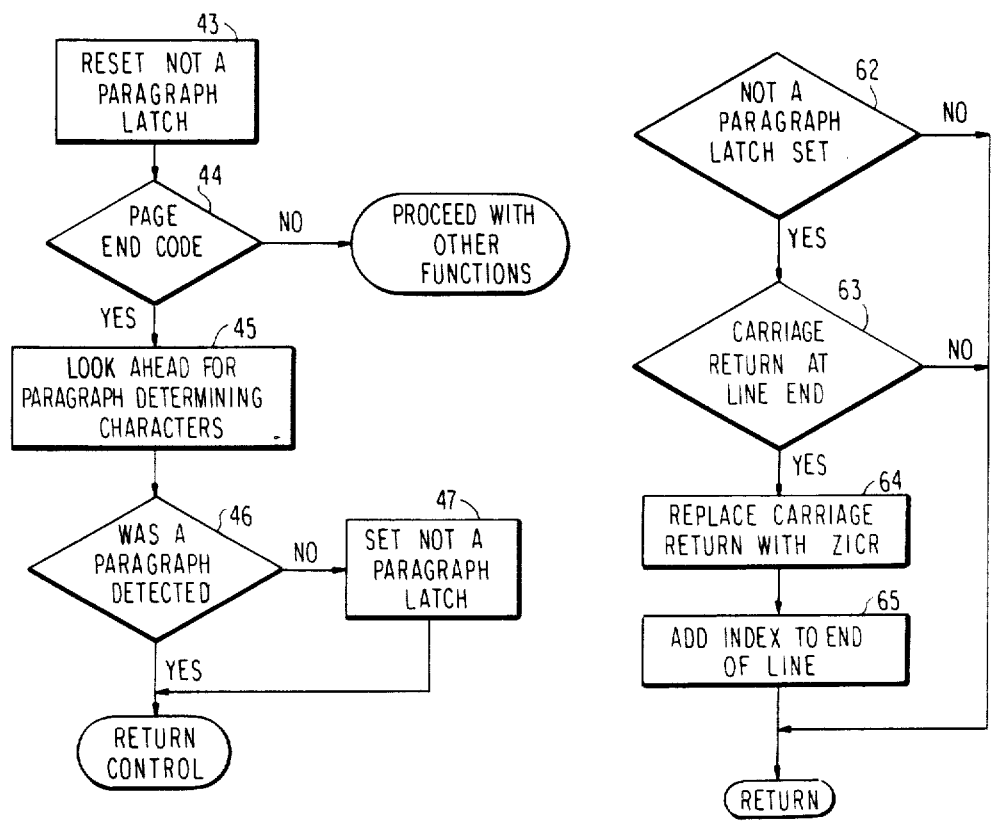
FIG. 4 is a flow chart of the logic of the page end code executor subroutine.
FIG. 5 is a flow chart of the logic of single byte decoder of converter/processor 13.

With reference to FIG. 4, the process is initiated at function block 43 by first resetting the not a paragraph latch 34. This is done by the single byte decoder 40 when data is read in from RAM input buffer 30. When single byte decoder 40 decodes a page end code, decoder 40 transfers control to page end code executor 42, as indicated at decision block 44. Then the page end code executor 42 looks ahead for paragraph determining characters at function block 45. At decision block 46 a determination is made as to whether a paragraph was detected. If not, the not a paragraph latch 34 is set in function block 47. Control is then returned to a higher level program (not shown) after either setting or not setting the latch 34 depending on the result of decision block 46. When processing is completed by converter 12, the input character is moved by subroutine to RAM intermediate buffer 31 from where it can be accessed by converter 13.

With reference to FIG. 5, converter 13 accesses the intermediate buffer 31 by reading data into single byte decoder 60. With each line of data, the decoder 60 tests the latch 34 to see if it is set indicating the condition of not a pragraph. This is indicated in decision block 62, and if the latch 34 is set, the decoder 60 looks ahead for a carriage return at the end of the line as indicated in decision block 63. If there is, then in function block 64 the carriage return is replaced by a ZICR, and this is followed in function block 65, by the addition of an index at the end of the line. At this point, the PDS from converter 12 has been modified by converter 13 in accordance with the invention to produce the new print level data stream. Subroutine 66 then moves the input character to the RAM output buffer 32 which is accessed by the communications access method.

We claim:

1. A word processor system including means for converting a revisible data stream to a printable data stream comprising a sequential data stream of control data and character data, said printable data stream not being revisible, said means for converting comprising means for inserting into said printable data stream control data indicating the beginning and the end of a selected group of lines of printable characters to be justified whereby said selected group of lines may include a paragraph bridging two pages having a page footer on at least the first of the two pages, means for preventing justification of any line in said group which is at the end of a paragraph, and means for inserting into said printable data stream data representative of a page footer to be printed at the bottom of said at least the first of the two pages, said word processor system further including means for modifying said printable data stream to permit justification of the last body text line on a page containing a page footer when said last body text line is not a paragraph end, said means for modifying comprising:
  means for temporarily storing the printable data stream from said means for converting,
  means for determining from said printable data stream whether the last line on a page containing a footer is at the end of a paragraph, and
  means connected to said means for temporarily storing and to said means for determining for modifying said printable data stream in said means for temporarily storing to permit justification of said last body text line when said last body text line is not a paragraph end.

2. The system recited in claim 1 wherein said means for determining includes a latch which is set when said last line is not a paragraph end.

3. The system recited in claim 2 wherein said means connected to said means for determining is responsive to said latch being set and comprises means for checking to see if said last line ends with a carriage return and, if so, replacing the carriage return with a zero-index-carriage return.

4. The system recited in claim 3 wherein said means for modifying said printable data stream includes means for adding an index after said zero-index-carriage return.

5. In a method of converting a revisable data stream to a printable data stream of control data and character data, at least some of said control data indicating the beginning and the end of a selected group of lines of printable characters to be justified wherein said selected group of lines may include a paragraph bridging two pages, said printable data stream not being revisable, the improvement in permitting the justification of the last body text line of a paragraph bridging two pages at least the first of which has a page footer following the body text comprising the steps of
  checking the revisible data stream during conversion from a reversible data stream to a printable data stream for a last body text line on a page containing a page footer,
  determining if the last body text line is not the end of a paragraph and, if not, setting a latch,
  temporarily storing the converted printable data stream,
  checking said latch for each line of the temporarily stored printable data stream and also checking to see if the line ends with a carriage return, and
  if said latch is set and the line ends with a carriage return, replacing the carriage return with a zero-index-carriage return, thereby modifying said printable data stream and permitting justification of the last body text line of the page.

6. The method recited in claim 5 comprising the further step of adding an index after said zero-index-carriage return.

7. A method of converting a revisible data stream to a printable data stream of control data and character data, said printable data stream not being revisible, said method comprising the steps of
  inserting into said printable data stream control data indicating the beginning and the end of a selected group of printable characters to be justified,
  preventing justification of any line in said group which is at the end of a paragraph,
  inserting into said printable data stream data which is representative of a page footer to be printed at the bottom of at least one page,
  temporarily storing said printable data stream,
  determining whether the last body text line on a page containing a footer is at the end of a paragraph in the temporarily stored printable data stream, and
  if the last body text line on a page containing a footer is not at the end of a paragraph, permitting said last body text line to be justified by modifying the temporarily stored printable data stream.

8. The method recited in claim 7 wherein said step of determining includes the step of setting a latch when said last body text line on a page containing a footer is not at the end of a paragraph, and wherein said step of permitting includes the step of checking said latch.

9. The method recited in claim 8 wherein said step of permitting further includes the steps of
  looking ahead for a carriage return code at the end of said last body text line, and
  replacing a carriage return code found at the end of said last body text line with a zero-index-carriage return code.

10. The method recited in claim 9 further comprising the step of adding an index code after said zero-index-carriage return code.

* * * * *